US007782713B2

(12) United States Patent
Talarico

(10) Patent No.: US 7,782,713 B2
(45) Date of Patent: Aug. 24, 2010

(54) APPARATUS FOR DIARIZING JANITORIAL SERVICE

(75) Inventor: Anthony M. Talarico, Ontario (CA)

(73) Assignee: Hurley Corporation, Toronto (CA)

( * ) Notice: Subject to any disclaimer, the term of this patent is extended or adjusted under 35 U.S.C. 154(b) by 0 days.

(21) Appl. No.: 12/245,268

(22) Filed: Oct. 3, 2008

(65) Prior Publication Data

US 2009/0092008 A1    Apr. 9, 2009

Related U.S. Application Data

(63) Continuation of application No. 10/672,360, filed on Sep. 26, 2003, now abandoned.

(30) Foreign Application Priority Data

May 21, 2003   (CA) .................................... 2429223

(51) Int. Cl.
*G04B 47/00* (2006.01)
*G04C 17/00* (2006.01)
*G04C 19/00* (2006.01)
*G07C 11/00* (2006.01)

(52) U.S. Cl. .............................. 368/10; 368/29; 368/82; 340/286.06

(58) Field of Classification Search ...................... 368/9, 368/10, 28, 29, 82; 340/540, 286.06–286.09; 702/177, 178
See application file for complete search history.

(56) References Cited

U.S. PATENT DOCUMENTS

| 4,653,931 | A | * | 3/1987 | Takeda ........................ 368/205 |
| 4,769,765 | A | * | 9/1988 | Green ........................... 700/16 |
| 4,835,372 | A |  | 5/1989 | Gombrich et al. |
| 4,860,267 | A | * | 8/1989 | Herrington et al. ............. 368/10 |
| 4,925,495 | A | * | 5/1990 | Crisp et al. .................... 134/18 |
| 5,691,932 | A | * | 11/1997 | Reiner et al. .................. 368/10 |
| 5,805,530 | A | * | 9/1998 | Youngberg .................... 368/47 |
| 5,945,910 | A | * | 8/1999 | Gorra ....................... 340/573.1 |

(Continued)

FOREIGN PATENT DOCUMENTS

CA            2307153         4/2000

OTHER PUBLICATIONS

Symbol Technologies, Inc., 2002, SPT 1550, pp. 1-2, United States.

(Continued)

*Primary Examiner*—Vit W Miska
(74) *Attorney, Agent, or Firm*—Lang Michener LLP

(57) ABSTRACT

The invention provides an apparatus for diarizing the performance of janitorial services that includes an electronic display unit for indicating when a service was last completed and an input device for signalling when the display is to be updated. The apparatus can include a chassis mountable on a wall of a facility being maintained by a janitorial service, and at least one electronic display framed by a window on said chassis, said chassis for displaying a time when said facility was last maintained. The apparatus can also include a central processing unit connected to said display and for updating the display based on a user-input received from an input device that is mounted to said chassis and connected to the central processing unit. The input device is actuated at a time that is substantially coterminous when said facility was last maintained.

21 Claims, 6 Drawing Sheets

U.S. PATENT DOCUMENTS

| | | | | |
|---|---|---|---|---|
| 6,069,848 | A | * | 5/2000 | McDonald et al. .......... 368/107 |
| 6,483,779 | B1 | * | 11/2002 | Teixeira ....................... 368/10 |
| 6,608,560 | B2 | * | 8/2003 | Abrams ................. 340/539.14 |
| 6,819,238 | B2 | * | 11/2004 | Pecora et al. ............... 340/540 |
| 2002/0030595 | A1 | * | 3/2002 | Kasik ...................... 340/568.1 |
| 2003/0036915 | A1 | * | 2/2003 | Neumann et al. .............. 705/1 |

OTHER PUBLICATIONS

Symbol Technologies, Inc., 2002, SPT 1800, pp. 1-2, United States.
Symbol Technologies, Inc., 2003, PSM20i, pp. 1-2 United States.

* cited by examiner

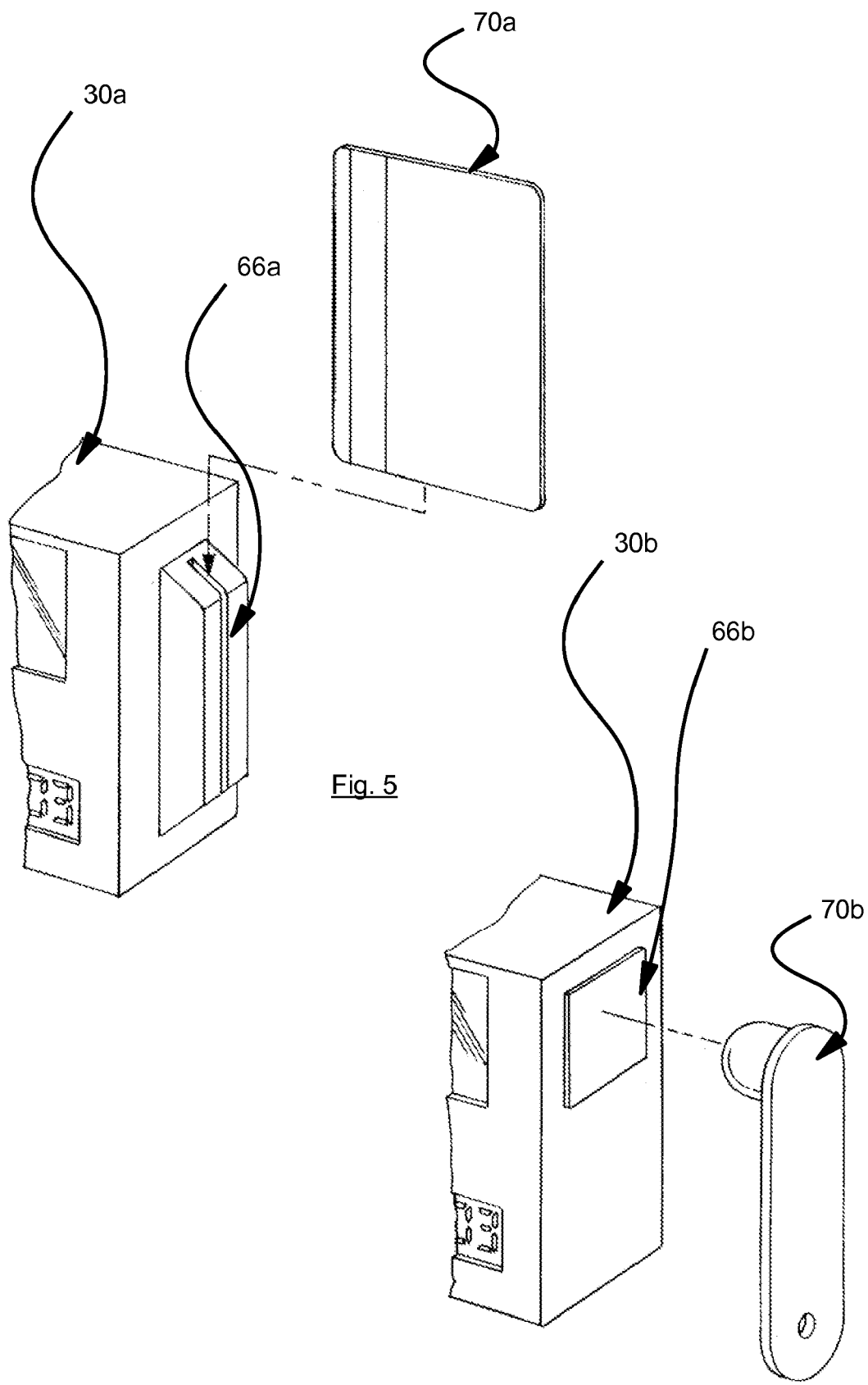

APPARATUS FOR DIARIZING JANITORIAL SERVICE

PRIORITY CLAIM

This application is a continuation of U.S. Ser. No. 10/672,360, filed Sep. 26, 2003, which claims priority from Canadian Application No. 2,429,223, filed May 21, 2003, the contents of which are incorporated herein by reference.

FIELD OF THE INVENTION

The present invention relates generally to janitorial services, and more particularly relates to an apparatus for the diarizing the performance of janitorial services.

BACKGROUND OF THE INVENTION

Janitorial services need to be provided in virtually all public facilities, particularly where there are public restroom facilities. Cleanliness and sanitation are important for the health and comfort of patrons. Accordingly, it is well known to provide regular, scheduled cleaning of such public facilities. The task of scheduling can be relatively straightforward or exceedingly complex, depending on the size of the facilities, the number of patrons who use the facilities, and the frequency with which the facilities are used. Thus, the proverbial small bistro with a single restrooms may only need one or two cleanings a day, whereas a major international airport will have dozens of restrooms with multiple toilets and sinks that may need require scheduled cleanings several times a day, and over fairly regular intervals over any given twenty-four hour period. A further complication with large facilities is the management of the several hundred cleaning staff that are responsible for all of the scheduled cleanings. Still further complexity is added when those cleaning staff are not directly employed by the facility, but are employed by a cleaning services company that is contracted to provide such services to the facility.

The diarizing of the performance of janitorial services is also an important aspect of the provision of such services. While a cleaning schedule may be established and various cleaning staff assigned, such a schedule will be meaningless if it is not actually performed, and it is therefore also known to diarize the actual performance of cleaning services. Again, where such services are performed by a cleaning services company under contract, then the facility will typically require a diary or record proving that the services are actually being performed. Furthermore, by prominently posting such records as the services are being performed, patrons can be assured that the facility they are using is receiving regular attention. Additionally, such diaries may be relevant in any lawsuit involving allegations that a facility's lack of cleanliness lead to personal injury—e.g. a slip and fall on a puddle of water. A diary that demonstrate regular cleaning services were being provided may mitigate damages or serve as a defense to a negligence claim against the facility and the cleaning services company.

Typically, the diarizing is done using pen and paper. It is very common to provide an sheet of paper, perhaps removably mounted behind a plexiglass frame, which in itself is mounted to the wall. The sheet of paper is updated by a cleaner once a particular facility or area of that facility has been cleaned. The cleaner will typically remove the sheet, and write in the time, date when the facility was cleaned. There is often space of the cleaner to initial or sign the sheet beside the time and date entry, and may also include room for other information.

This manual system presents a number of disadvantages. First, the cleaner must take additional time out of their cleaning schedule to complete the form. Further, there is typically no convenient surface in the facility to complete the form, which may therefore force the cleaner to carry a clipboard with him or her, thereby further burdening the cleaner with extra equipment. Additionally, once the sheet is completely filled, the cleaner may have to carry their own blank sheets. Still a further disadvantage is the need for someone to collect the sheets on a periodic basis and, if reports are to be provided, the data on each sheet needs to be tabulated and entered into a computer, leading to extra labour and a delay between the time the service was performed and the availability of a report to the facility verifying that such services were performed. An additional disadvantage is that the cleaner's handwriting may not be legible, or the spaces provided on the sheet to small, so patrons do not get the benefit of seeing when the facility was last cleaned in a convenient manner. Furthermore, it is often the case that cleaning staff's may represent a diverse range of cultural backgrounds and first languages, making the explanation of how the sheets are to be completed a difficult task. Still further disadvantages to the current diarizing system will occur to those of skill in the art.

SUMMARY OF THE INVENTION

It is therefore an object of the invention to provide a novel apparatus for diarizing janitorial services that obviates or mitigates at least one of the above-identified disadvantages of the prior art.

An aspect of the invention provides an apparatus for diarizing janitorial services including a chassis mountable on a wall of a facility that is being maintained by a janitorial service. The apparatus includes at least one electronic display framed by a window on the chassis. The display is for displaying a time when the facility was last maintained. The apparatus also includes a central processing unit and a clock connected to the display and for updating the display based on a user-input received from an input device connected to the central processing unit. The user-input is received at a time substantially coterminous with a time when the facility was last maintained.

BRIEF DESCRIPTION OF THE DRAWINGS

Embodiments of the invention will now be discussed, by way of example only, with reference to the attached Figures, in which:

FIG. 5 shows a partial view of an apparatus for diarizing janitorial services in accordance with another embodiment of the invention;

FIG. 6 shows a partial view of an apparatus for diarizing janitorial services in accordance with another embodiment of the invention; and, FIG. 7 shows a partial view of an apparatus for diarizing janitorial services in accordance with another embodiment of the invention.

DETAILED DESCRIPTION OF THE INVENTION

Figure 1:
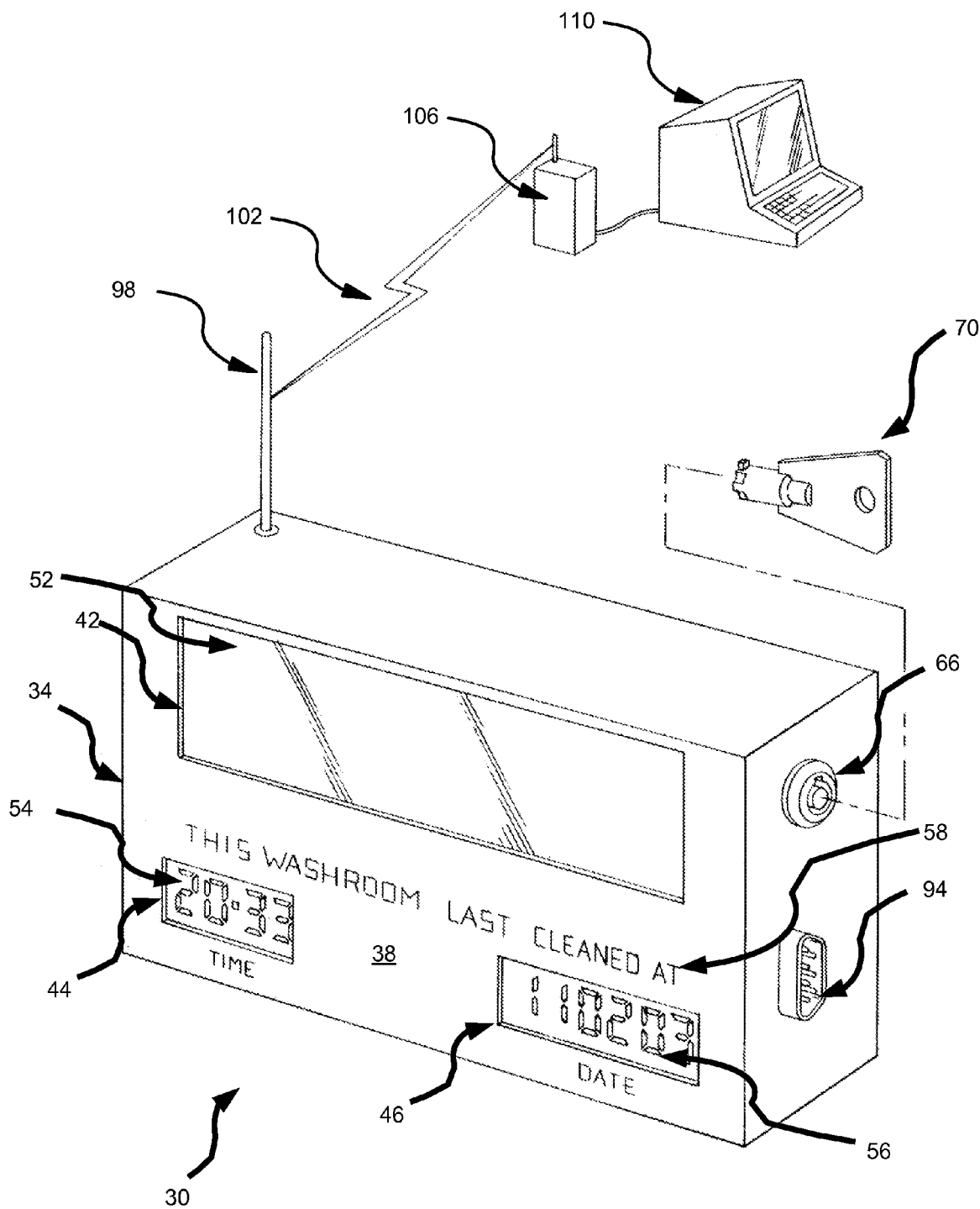
FIG. 1 is a perspective view of an apparatus for diarizing janitorial services in accordance with an embodiment of the invention.
Figure 2:
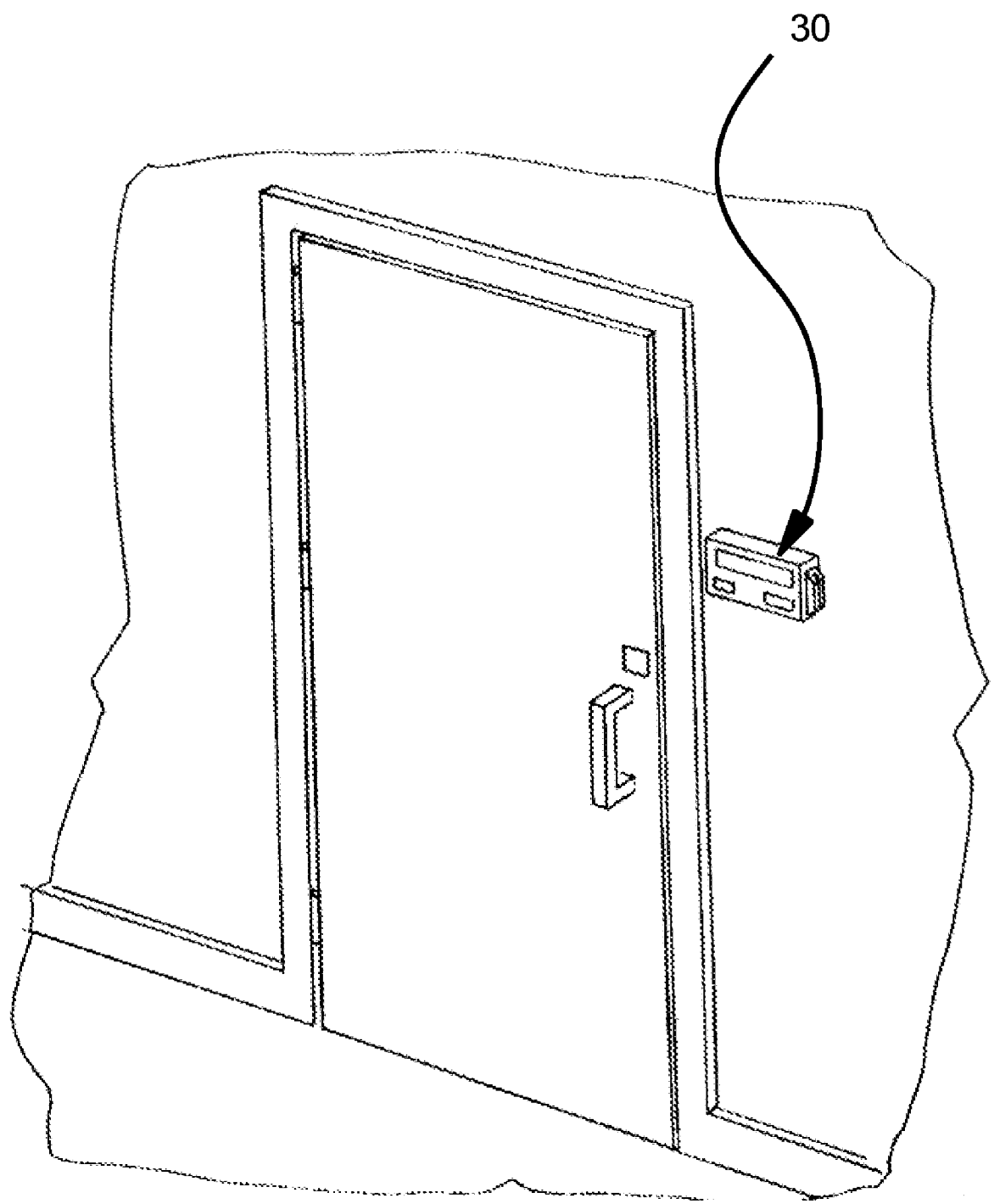
FIG. 2 shows the apparatus of FIG. 1 mounted beside a door at the exit of a facility that is being cleaned and for which such cleaning is being diarized by the apparatus of FIG. 1.

Referring now to FIG. 1, an apparatus for diarizing janitorial services in accordance with an embodiment of the invention is indicated generally at 30. Apparatus 30 is located in any area of a facility where cleaning services are performed. As seen in FIG. 2, a typical place for mounting apparatus 30 is at the door where patrons exit a washroom, such as a public washroom located in an airport or the like.

Referring again to FIG. 1, apparatus 30 comprises a chassis 34 that in a present embodiment is a substantially rectangular shaped box. Chassis 34 can be made from any desired material, but is preferably made from a durable, rugged material such as metal or a very resilient plastic. In general, the materials chosen to fabricate chassis 34 are rugged and capable of withstanding a drop from a distance of five feet or greater, and capable of protecting the contents of chassis 34 during the drop, and also being lightweight and relatively simple to manufacture.

The front face 38 of chassis 34 includes a plurality of windows 42, 44 and 46. In turn, windows 42, 44 and 46 each frame a display 52, 54 and 56 respectively. Displays 52, 54 and 56 are based on liquid crystal display ("LCD") technology in the present embodiment, but can be based on other display technologies such as organic light emitting diode ("OLED") or thin film electroluminescent ("TFEL"). It is also presently preferred that displays 52, 54 and 56 are optimized for reduced power consumption, so that apparatus 30 can have a self-contained battery that needs infrequent changes, but this is not a requirement as the power supply for apparatus 30 can also be hardwired into the facility where apparatus 30 is mounted. One suitable LCD based type of display with lower power consumption characteristics includes the Cholesteric Liquid Crystal Display ("CLD") Technology available from Kent Displays, Inc., 343 Portage Blvd., Kent, Ohio 44240. Such CLDs only use power when they are refreshed, thus making them suitable for the present application. Other types of displays will occur to those of skill in the art.

In the present embodiment, display 52 is operable to display any general information that may be desired. One type of general information that can be displayed is the trademarks of the facility where apparatus 30 is located and/or the trademarks of the cleaning services company which provides the cleaning services. The trademarks can be accompanied by a "Welcome" message or the like. Additional general information can include advertisements, news, weather information, sports scores or the like. Where apparatus 30 is located in an airport, then display 52 can be operable to display flight departure and arrival information. Similarly, if apparatus 30 is located in a bus terminal then display 52 can be operable to display bus departure and arrival information. Other types of general information can also be displayed on display 52 as desired.

Display 54 is a simple segmented display for displaying the time of day. In FIG. 1, the time of day is expressed in twenty-four hour format, but other formats can be chosen as well. Similarly, display 56 is a simple segmented display for displaying the date. In FIG. 1, the date is presented in the Day/Month/Year format, but other formats can be used as well. In the space between window 52 and windows 54, and 56 is a message 62 indicating the relevance of the time and date indicated on displays 54 and 56 respectively. In the present embodiment, message 62 reads "This Washroom Was Last Cleaned At", however message 62 could also indicate other locations where apparatus 32 may be mounted, and/or may be expressed one or more languages that reflect the language of at least the majority of the patrons who will view apparatus 30. Similarly, message 62 could also be included as a static message on display 52, as desired.

Figure 3:
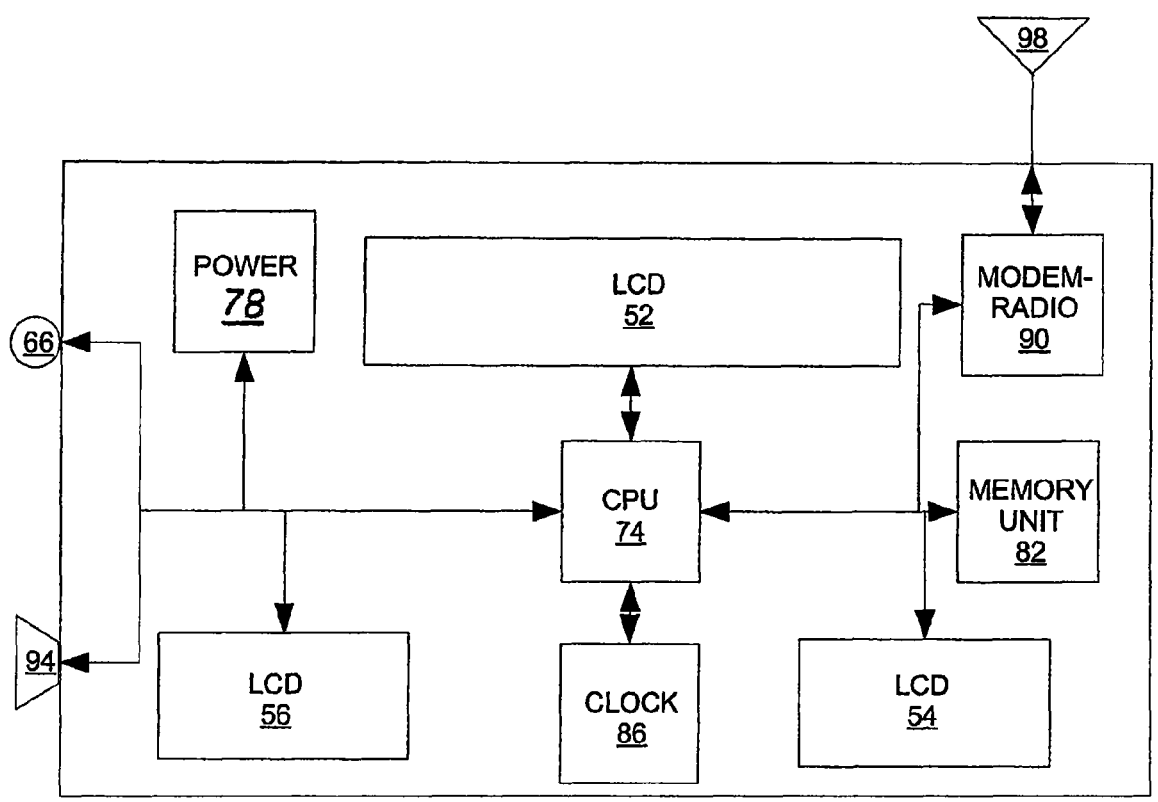
FIG. 3 is a schematic block diagram of the electrical components within the apparatus of FIG. 1.

Apparatus 30 also includes a user-input device in the form a lock-switch 66. Lock-switch 66 can be actuated with a key 70 that corresponds with lock-switch 66. As best seen in FIG. 3, lock-switch 66 is connected to a central processing unit (CPU) 74, that in turn interconnects a power supply 78, a memory unit 82, a clock 86, a modem-radio unit 90, a serial connector 94 and displays 52, 54, and 56. Upon receipt of a signal at CPU 66 that lock-switch 66 has been actuated, CPU 66 reads the current time and date from clock 86, and then send a refresh signal to displays 54 and 56 respectively, so that displays 54 and 56 will display the time and date when lock-switch 66 was actuated.

Accordingly, a cleaner assigned to clean the facility where apparatus 30 is located will be provided with a copy of key 70, and instructed to use key 70 to activate lock-switch 66 once the cleaner has finished cleaning that facility. Apparatus 30 will then update the time and date displayed on displays 54 and 56 respectively, thereby indicating to patrons and other interested parties when the facility was last cleaned.

Apparatus 30 is further operable to store in memory unit 82 records representing the time and date when lock-switch 66 was activated, for later download.

Referring again to FIGS. 1 and 3, apparatus 30 includes an antenna 98 connected to modem-radio unit 90, which in turn is connected to CPU 74. Modem-radio unit 90 can be based on any wireless protocol, such as wireless LAN protocols like, 802.11, blue-tooth or can be based on cellular telephone protocols such as CDMA, GSM, TDMA etc. Depending on the protocol, modem-radio 90 is thus configured to communicate over a wireless channel 102 to a wireless base station 106, which in turn connects to a computing device 110. In the present embodiment, computing device 106 is a desktop computer, however, any type of computing device can be used. Furthermore, computing device 110 in FIG. 1 is shown connected directly to base station 106, but it is to be understood that computing device 110 can be connected to base station 106 via a local area network or wide area network, such as the Internet. Computing device 110 contains software that allows device 110 to communicate with apparatus 30. Computing device 110 is thus operable to update clock 86, update messages to be displayed on display 52, and/or download records from memory unit 82 a plurality of records over a given period that indicate various dates and times when lock-switch 66 was activated. In this latter situation, such downloaded records can used for a variety of purposes, such as to be compiled into a report for delivery to the management of the facility where apparatus 30 is located so that the management can verify that the facility is being cleaned according to any set schedule. Where computing device 110 is connected to the Internet, such reports can be made available by web-page or the like to any party with Internet access. Any number of known security features can also be applied to such Internet access as desired.

Figure 4:
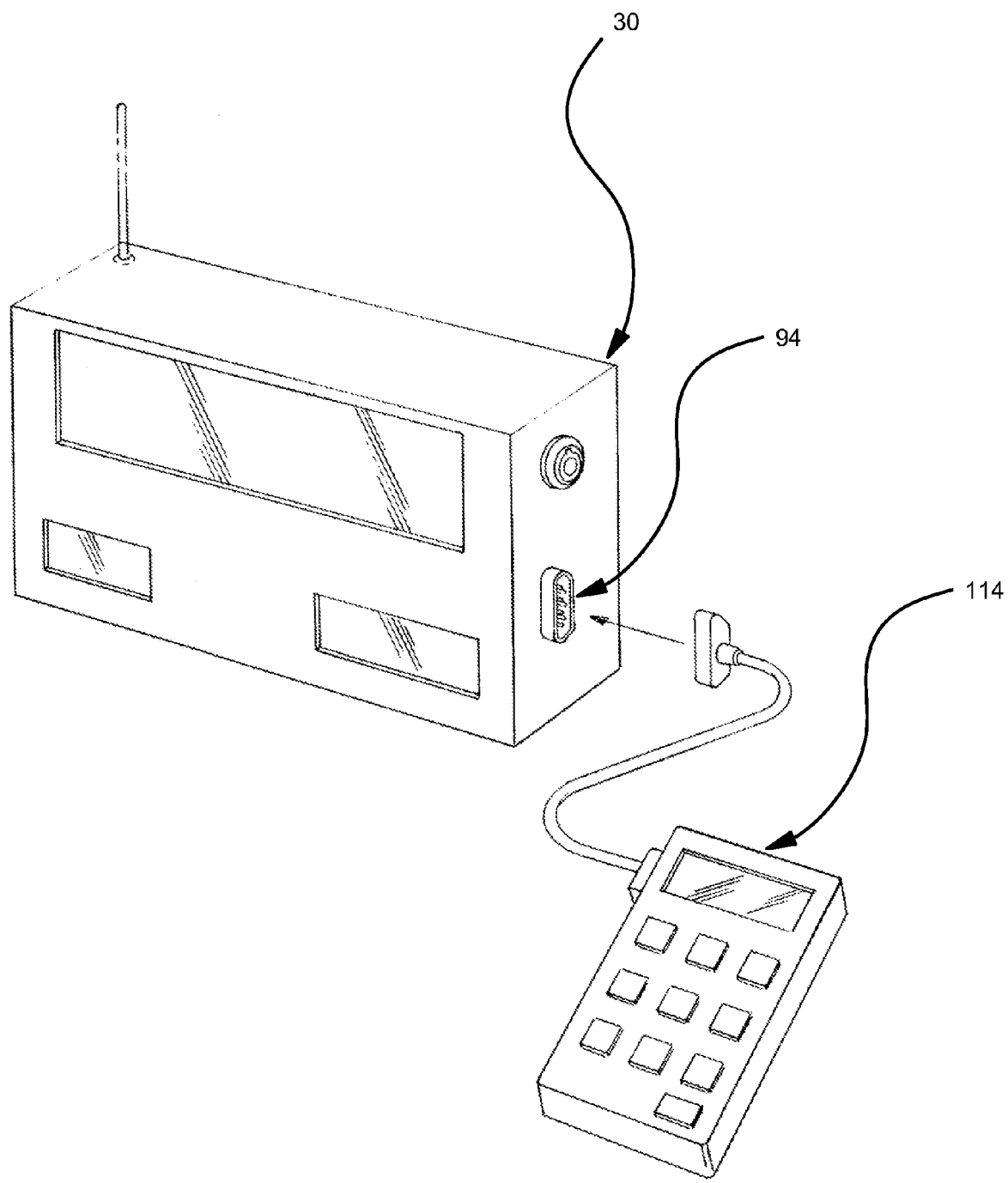
FIG. 4 is a perspective view of the apparatus of FIG. 1 shown in conjunction with a computing device that is connectable to the apparatus.

As best seen in FIG. 3, apparatus 30 also includes serial connector 94 that is connected to CPU 74. As best seen in FIG. 4, serial connector 94 can be used to connect a computing device 114 to apparatus 30. Computing device 114 can be any number of types of computers, such as a laptop, personal digital assistant (PDA), desktop computer or the like. In the present embodiment, computing device 114 is a PDA. Computing device 114 is thus operable to perform substantially the same functions as computing device 110, except that where records stored in memory unit 82 are collected by computing device 114, then such collected records will in turn be downloaded into another computing device, such as computer device 110, in order to make the data collected therein available over the Internet, where such functionality is to be offered.

In another embodiment of the invention shown in FIG. 5, a sectional view of an apparatus 30a is shown. Apparatus 30a is substantially the same as apparatus 30, except that serial connector 94 is omitted and lock-switch 66 is substituted for a card-reader 66a. Card-reader 66a is activated by a corresponding magnetic-striped card 70a. Thusly, magnetic-striped card 70a and card-reader 66a can be used in substantially the same manner as key 70 and lock-switch 66. However, in contrast to apparatus 30, a plurality of different magnetic-striped cards 70a can be issued to each cleaner, which identifies the cleaner. Thus, when card 70a is swiped through reader 66a, the identity of the cleaner will also be captured, at the same time that the time and date are recorded in apparatus 30a and displayed thereon. Optionally, the identity of cleaner 70a can also be displayed on apparatus 30a. FIG. 6 shows still a further variation, where apparatus 30b is shown having an RF-tag receptor 66b which responds to an RF-tag 70b when the RF-tag 70b is proximal to RF-tab receptor 66b. RF-tag receptor 66b and RF-tag 70b thus operate substantially the same way as card-reader 66a and magnetic-striped card 70a. Other types of input devices for use with the apparatus, and corresponding means for activating those input devices will now occur to those of skill in the art.

Figure 7:
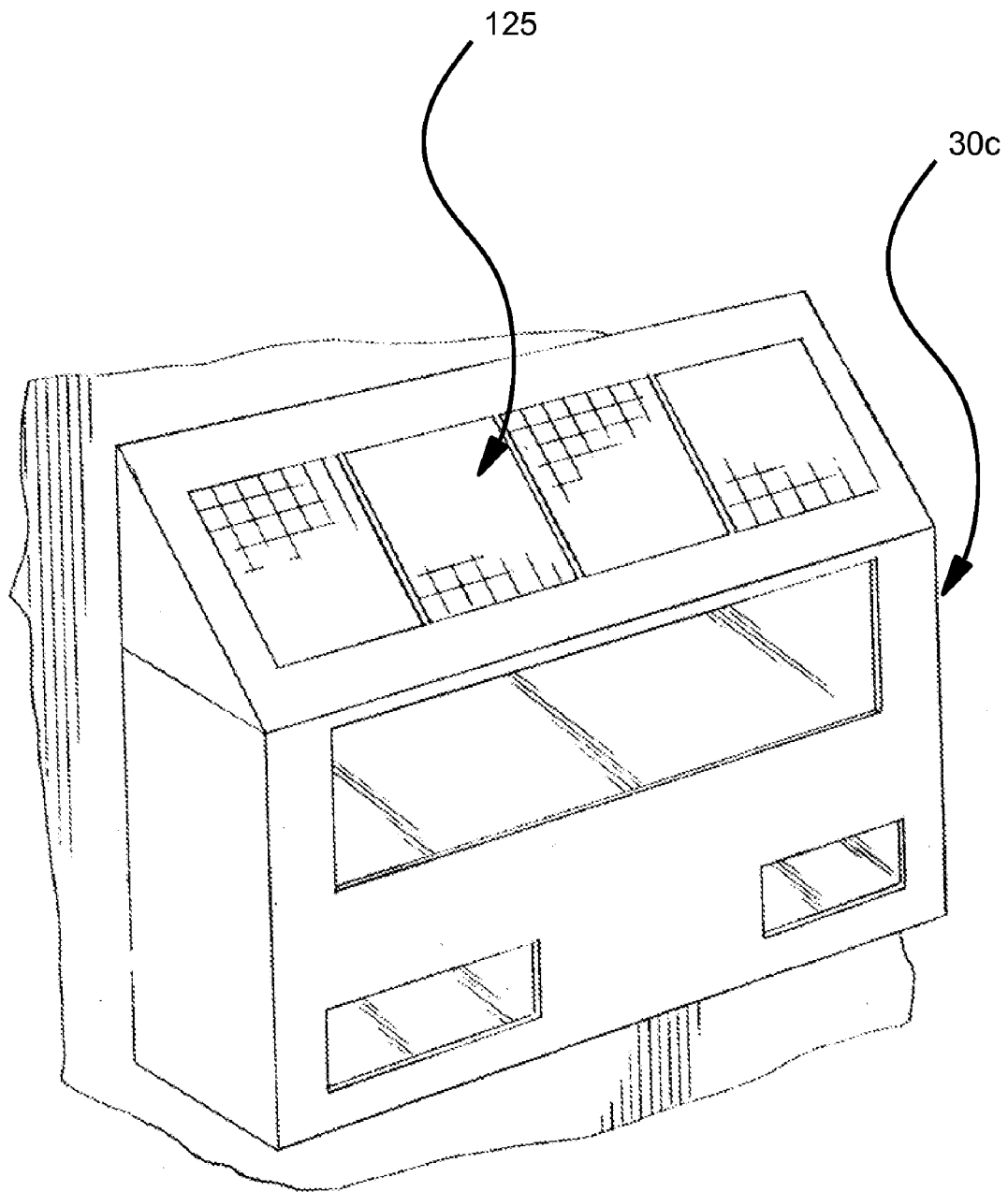

Another embodiment of the invention in shown in FIG. 7, which shows an apparatus 30c that is substantially the same as apparatus 30, but which includes a solar panel 125, which is used to provide a self-contained power supply for apparatus 30c. The solar panel 125 can be configured to be the sole power supply for apparatus 30c, or as a supplement to some other power supply used to power apparatus 30c. Apparatus 30c can also be modified to include an antenna, such as antenna 98, but located in a different location than shown on apparatus 30.

While only specific combinations of the various features and components of the present invention have been discussed herein, it will be apparent to those of skill in the art that desired subsets of the disclosed features and components and/or alternative combinations of these features and components can be utilized, as desired. For example, while apparatus 30 includes three display screens, fewer or additional display screens can be used, as desired. Where one screen is used, then all information is typically shown on the single screen.

In another embodiment of apparatus 30, modem-radio unit 90, serial connector 94, antenna 98 and display 52 are omitted. In this variation, apparatus 30 simply displays an updated date and time each time lock-switch 66 is actuated, thereby indicating when the facility was last cleaned. In other embodiments, various other components can be added and/or omitted.

Furthermore, while the embodiments discussed herein relate primarily to cleaning services, it is to be understood that these embodiments and the invention can be applicable to other types of janitorial and/or maintenance services or the like.

Also, while apparatus 30 is shown with a serial connector 94, other types of data connectors can be used, such as USB, Ethernet, infrared etc.

The above-described embodiments of the invention are intended to be examples of the present invention and alterations and modifications may be effected thereto, by those of skill in the art, without departing from the scope of the invention which is defined solely by the claims appended hereto.

The invention claimed is:

1. An apparatus for maintaining janitorial services information at a facility comprising:
   a chassis mountable on a wall of said facility being periodically cleaned by a janitorial service;
   at least one electronic display on said chassis, said display for displaying a time substantially coterminous with a time when said facility was last cleaned;
   a central processing unit (CPU), memory and a clock connected to said display and for updating said display based on a user providing a user-input received from an input device connected to said central processing unit, said user-input being received at a time substantially coterminous with said time when said facility was last cleaned and said user-input identifying said user; and
   said memory storing a log of the time of said user-input and the identity of said user; and,
   said display displaying said time substantially coterminous with said time when said facility was last cleaned, until said time is changed by receipt of a subsequent user-input.

2. The apparatus according to claim 1 further comprising an antenna connected to a modem-radio unit which in turn is connected to said CPU, said modem-radio unit operable to communicate with at least one wireless-enabled remote computing device for uploading of the log stored in the memory.

3. The apparatus according to claim 1 further comprising a data communication port connected to said CPU, said communication port unit operable to communicate with at least one remote computing device for uploading the log stored in the memory.

4. The apparatus according to claim 1 further comprising an additional display for displaying a message relevant to said facility.

5. The apparatus according to claim 4 wherein said message includes a trademark belonging to at least one of said facility and a cleaning services company contracted to maintain said facility.

6. An apparatus for maintaining janitorial services information at a facility comprising:
   a chassis mountable on a wall of said facility being periodically cleaned by a janitorial service;
   at least one electronic display on said chassis, said display for displaying a time substantially coterminous with a time when said facility was last cleaned;
   a central processing unit (CPU), memory and a clock connected to said display and for updating said display based on a user providing a user-input received from an input device connected to said central processing unit, said user-input being received at a time substantially coterminous with said time when said facility was last cleaned and said user-input identifying said user;
   said memory storing a log of the time of said user-input and the identity of said user;
   said display displaying said time substantially coterminous with said time when said facility was last cleaned, until said time is changed by receipt of a subsequent user-input; and,
further comprising an additional display for displaying a message relevant to said facility, wherein said facility is a public transportation depot and said additional display is operable to display departure and arrival information of transportation vehicles associated with said depot.

7. The apparatus according to claim 1 wherein said input device is selected from the group consisting of: a lock-switch, ibutton, a magnetic card reader, an RF tag reader, a barcode reader, a wireless device, a cellular phone and any combination thereof.

8. The apparatus according to claim 2 wherein said remote computing device is operable to update said clock.

9. The apparatus according to claim 3 wherein said remote computing device is operable to update said clock.

10. The apparatus according to claim 1 further comprising a self-contained power-supply within said apparatus.

11. The apparatus according to claim 10 wherein said self-contained power supply further comprises a solar panel.

12. An apparatus for maintaining periodic servicing information at a facility comprising:
   a chassis mountable on a wall of said facility being periodically cleaned by a service provider;
   at least one electronic display on said chassis, said display for displaying a time substantially coterminous with a time when said facility was last serviced;
   a central processing unit (CPU), memory and a clock connected to said display and for updating said display based on said service provider providing a user-input received from an input device connected to said central processing unit, said user-input being received at a time substantially coterminous with said time when said facility was last serviced and said user-input identifying said service provider; and
   said memory storing a log of the time of said user-input and the identity of said service provider; and,
   said display displaying said time substantially coterminous with said time when said facility was last serviced, until said time is changed by receipt of a subsequent user-input.

13. The apparatus of claim 12, further comprising an additional display for displaying messages.

14. The apparatus of claim 12, wherein said user-input is received from an input device, said input device being selected from the group consisting of: a lock-switch, ibutton, a magnetic card reader, an RF tag reader, a barcode reader, a wireless device, a cellular phone and any combination thereof.

15. The apparatus of claim 12, further comprising a wireless communications unit connected to said CPU, said wireless communications unit operable to communicate with at least one remote computing device for uploading the log stored in the memory.

16. The apparatus of claim 12, wherein said uploading of said log occurs at a time substantially coterminous with when said input device is actuated.

17. The apparatus of claim 12, wherein said remote computing device is a server capable of monitoring multiple instances of said apparatus.

18. A method of maintaining service information at a facility comprising the steps of:
   a) providing a device with a display at said facility, said display operative to display a time substantially coterminous with a time when said facility was last serviced;
   b) updating said display automatically on receipt of a user-input, said user-input being substantially coterminous with said time when said facility was last serviced and identifying a service provider;
   c) displaying the time until such time is changed by a re-occurrence of step b); and,
   d) maintaining a log of said times and service provider identities in said device.

19. The method of claim 18, further including a step of uploading the log to at least one remote computing device.

20. The method of claim 19, wherein said uploading step occurs at a time substantially coterminous with when said facility was last serviced.

21. The method of claim 18, wherein said service information is janitorial service information.

* * * * *